July 1, 1930.  D. C. GARROWAY  1,768,952
CIRCUIT INTERRUPTER
Filed Jan. 2, 1926  2 Sheets-Sheet 1

Inventor,
David C. Garroway

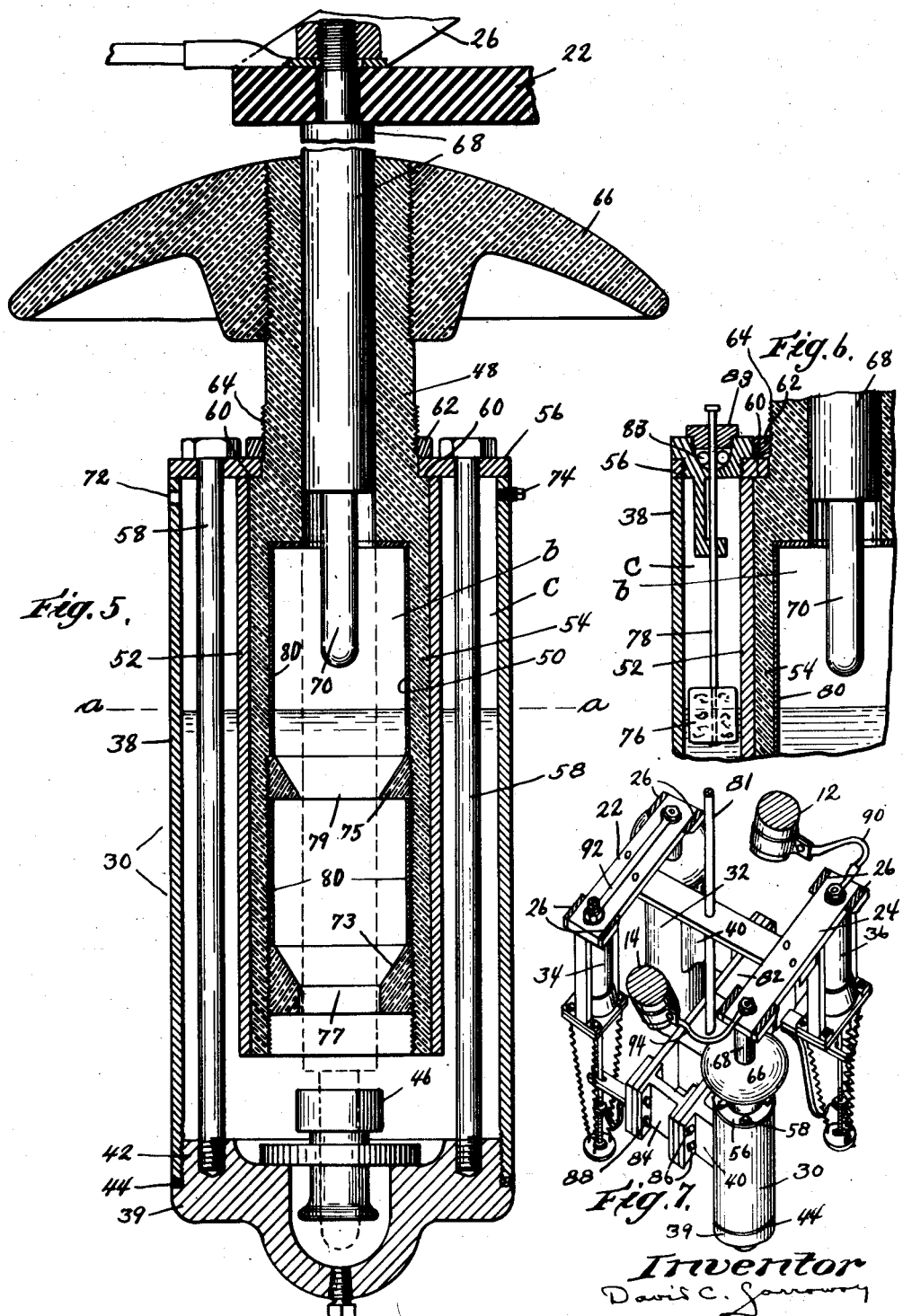

Patented July 1, 1930

1,768,952

UNITED STATES PATENT OFFICE

DAVID C. GARROWAY, OF BELMONT, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CIRCUIT INTERRUPTER

Application filed January 2, 1926. Serial No. 78,815.

This invention relates to circuit interrupters and is intended as an improvement on my co-pending application Serial No. 30,294, filed May 14, 1925.

In said co-pending application, I have disclosed means whereby the interruption of the circuit is effected by means including an electrolyte which is adapted to be included in the circuit at the time of circuit interruption.

An object of the present invention is to provide an improved electrolyte-containing structure in which the circuit is interrupted.

A further object is generally to improve the construction and operation of circuit interrupters.

Certain features of this invention are disclosed but not claimed in my co-pending applications Serial No. 78,816, filed January 2, 1926; and Serial No. 78,817, filed January 2, 1926.

Fig. 5 is an enlarged sectional elevation through one of the circuit interrupting pots taken along line 5—5 of Fig. 1.

Fig. 6 is a sectional detail taken along line 6—6 of Fig. 3 and illustrating particularly means for indicating the level of electrolyte in the pot.

Fig. 7 is a more or less diagrammatic perspective view illustrating particularly the circuit through the interrupter.

Figures 1, 2:
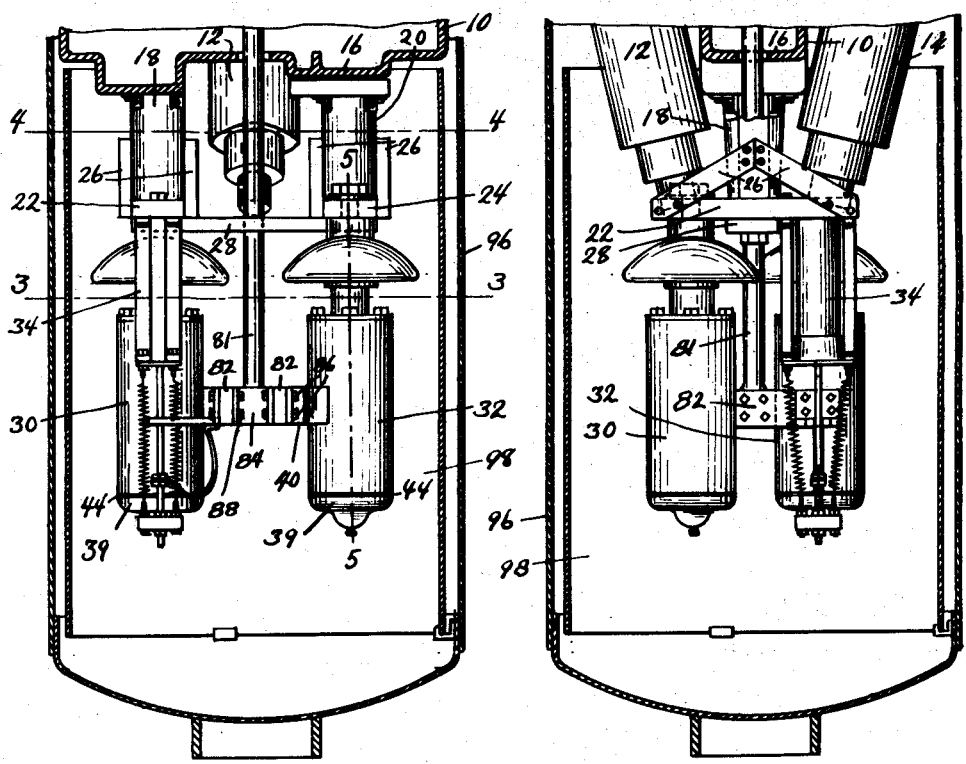
Fig. 1 is a front elevation of a portion of a circuit interrupter with the enclosing casing cut away to illustrate the invention.
Fig. 2 is a side elevation of the parts illustrated in Fig. 1.
Figure 3:
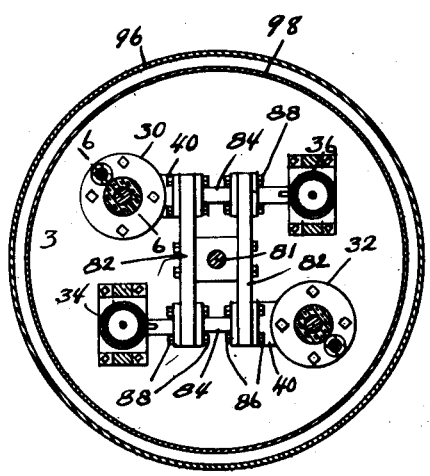
Fig. 3 is a section along line 3—3 of Fig. 1.
Figure 4:
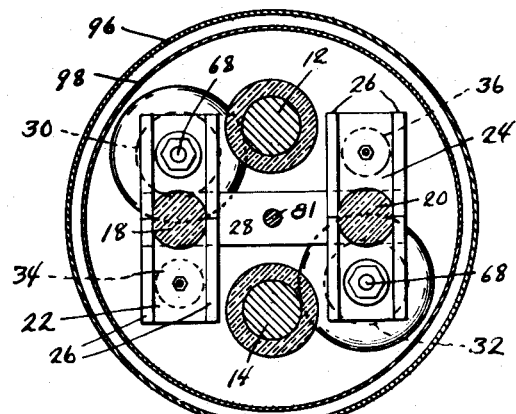
Fig. 4 is a section along line 4—4 of Fig. 1.

The circuit interrupter includes a housing 10 which is adapted to enclose the switch operating mechanism and support the switch terminals 12 and 14. The housing is formed with a bottom wall 16 to which the stationary circuit interrupting members and associated structure are secured. The stationary circuit interrupting members are supported from said housing by a frame which includes a pair of insulating pillars 18 and 20 which pillars are located on opposite sides of the vertical plane of the switch terminals.

Insulating bars 22 and 24 are secured to the lower ends of said pillars and extend horizontally in both directions therebeyond. Braces 26 are secured to the ends of said insulating bars and also to said pillars. An insulating cross bar 28 is secured to and is extended between said bars 22 and 24 and serves to guide and steady the movable switch member in its movements between switch open and closed position.

The circuit interrupter here shown comprises two pots 30 and 32 which are adapted to contain an electrolyte in which the metallic conducting circuit through the interrupter is broken. The interrupter also includes two pots 34 and 36 which are adapted to contain an insulating fluid, as oil, and contact members which are adapted to be separated under the oil only after the circuit has been interrupted in said pots 30 and 32, thereby to serve as disconnecting members, the function of which is to isolate the pots 30 and 32 positively from the circuit. The present invention resides mainly in the construction of the electrolyte containing pots and associated apparatus, the construction of which is illustrated best in Fig. 5. The pots 30 and 32 are identical and but one need be described.

The pot 30 comprises a shell or tube 38 which preferably is of steel. Said shell is screw-threaded internally at its lower end and is closed by a cap 39 which has an exteriorly screw-threaded boss 42 that is threaded into the lower open end of said shell 38 to make a fluid tight joint therewith. If desired, a packing gasket 44 may be interposed between said bracket and the lower end of said shell. Said shell 38 is preferably cylindrical in form and it is adapted to contain an electrolyte which is adapted to assist in interrupting the circuit through the interrupter. The cap 39 is provided with a contact member or bell 46 of more or less common construction, which bell is adapted to receive within it, a cylindrical rod which comprises the cooperating contact member.

Said pot is provided with means to form outer and inner electrolyte-containing compartments which are in free communication in the lower ends thereof. Circuit interruption is adapted to take place in the inner compartment and the fluid therein is adapted to be forced out of the open bottom of the inner compartment into the outer compartment and, by such movement, to assist in interrupting the circuit in a manner hereinafter to be described. To this end, the pot 30 is provided with a cylinder 48 of insulating material as bakelite, porcelain, or the like. Said insulating cylinder is extended into the pot, approximately co-axially therewith, and is terminated adjacent but slightly above the upper end of the contact member 46. Said insulating cylinder is provided with an internal cylindrical recess 50 therein which extends upwardly in the cylinder from the lower end thereof and is terminated somewhat below the top of the pot. Said recess forms the inner compartment above mentioned. The pot is adapted to be filled with an electrolyte of suitable conductivity to some lever $a$—$a$, which lever is adapted to be approximately the same in said compartment 50 and in the pot outside of said insulator. A chamber $b$ is adapted to be present in said inner compartment above the electrolyte level and a similar chamber $c$ is adapted to be present in the shell 38 above the electrolyte level. Both chambers are adapted normally to be at approximately atmospheric pressure. A reinforcing steel shell 52 is forced onto the lower end of said insulator 48 whereby to support the insulating wall 54 of said compartment against the pressures incident to circuit interruption therein. Said shell preferably is extended upwardly to a point suitably above the top of said compartment.

Said insulator 48 is formed with a reduced outer end which extends through a circular aperture in the circular cover plate 56 of the pot. Said cover plate is rigidly secured removably to the top of the pot by means including bolts 58 which pass through said cover plate and extend downwardly within the space between the pot and the shell 52 and are screw threaded removably into the bracket 42. The insulator 48 is formed with a shoulder 60 which abuts against the inner face of said cover plate and is secured removably in said relation by a lock nut 62 which is screw-threaded onto an exteriorly screw-threaded intermediate section 64 of the insulator and bears against the upper face of said cover plate.

A shell or petticoat 66 of insulating material is secured to the upper end of said insulator 48 and preferably is screw-threaded thereon. If the petticoat and insulator are composed of bakelite, the screw threads may be treated with a bakelite varnish and the petticoat thereafter screwed onto the insulator and the whole baked whereby to dry the varnish and thereby to seal the screw threaded connection against an electrical break down therethrough.

The stationary contact member comprises a rod 68 which is fixed to the insulating bar 22 for the pot 30, and to the bar 24 for the pot 32, and depends therebelow. Said rod is disposed within an axial recess in said insulator 48 and is adapted to be a close running fit therein. Said rod is provided with a reduced lower end portion 70 which is adapted to enter said movable contact member 46 and thereby complete the circuit through the pot.

As here shown, the rod 68 is fixed and the pot 30 and its associated components are adapted to be moved vertically about said rod to effect the engagement and separation of the contact members and thereby to complete and interrupt the circuit.

Said inner chamber may be provided with one or more baffles 73 and 75 which are disposed in vertically spaced relation and are secured within the chamber in any suitable manner, as by being removably screw-threaded therein. Said baffles are preferably formed of electrically insulating and heat-resisting material and have aligned apertures 77 and 79 through which the switch rod 68 is adapted to pass. A function of said baffles is to guide the electrolyte above them to flow downwardly into intimate contact with the circuit interrupting arc. For certain purposes the baffles may not be desired, and they can be removed.

The inner wall of said inner chamber preferably is provided with a heat-resisting lining 80 of mica or some other suitable material, to protect the insulating wall 54 against the heat of the arc.

The particular manner in which the circuit interrupter acts to interrupt the circuit depends largely upon the characteristics of the electrolyte employed. When the electrolyte has a relatively low electrical conductivity an arm from within the electrolyte when the contact members are separated. Some of the electrolyte in the vicinity of the arc will be vaporized and the vapor may rise into the space $b$ in the compartment 50 and build up a pressure therein. The pressure operates to force the electrolyte out of said compartment into the outer compartment and thereby to sweep the electrolyte around and through the arc whereby to cool it and cause it to become extinguished. After circuit interruption, the pressure within the inner compartment will disappear either by condensation of the vapor, leakage to the atmosphere around the rod 68, or both. The liquid in the outer compartment will return by gravity into the inner compartment thereby to regain normal conditions of fluid level. The outer compartment may be vented suitably by vent passages 72 formed in the upper portion of the pot. Said vent passages are disposed in a manner to direct the air in the compartment $c$ and any electrolyte that may pass through said vent passages in a direction away from the insulating shield 66, whereby to reduce the possibility of flashover about said shield.

If the electrolyte has substantial conductivity a circuit interrupting arc may not be drawn at the moment the contact members are separated so that, when the contact members are separated and are yet immersed in the electrolyte, the electrolyte may act as a fluid resistor which is interposed in the circuit. The fluid column within the compartment 50 may be vaporized by the heat developed by the current passing through it whereby to interrupt the circuit. If the electrolyte has relatively great conductivity a circuit interrupting arc may not be drawn when the contact members separate; neither may the electrolyte column within the inner compartment be vaporized. Under these circumstances, a circuit-interrupting arc will be drawn between the surface of the electrolyte and the tip 70 of the contact member 68 as the electrolyte is moved below the lower end of said contact member. The arc will serve to vaporize some of the electrolyte and build up a pressure in the compartment above the electrolyte level. This pressure will operate to force the electrolyte downwardly in the compartment and thereby attenuate and ultimately interrupt the arc. The movements of the electrolyte, and thereby the action of the interrupter, may be controlled to some degree by the vents 72. Preferably the vent passages 72 should be rather restricted so that some pressure will be built up within the space c when the electrolyte is moved upwardly therein, thereby to prevent an undue elevation of electrolyte in said space due to its momentum and consequently to prevent loss of electrolyte through the vents. The restricted vent opening also retards the return movement of the electrolyte whereby to prevent it from moving materially beyond its normal position due to its inertia and sufficiently to make contact momentarily with the stationary contact member 68. The control of the vent passage is preferably obtained by providing a plurality of vent passages 72 each of relatively small size and closing such passages as are not desired by plugs 74 one of which is here shown.

The height of the liquid in the pot may be indicated by a float 76 which is disposed in the space between the outer and inner shells of the pot. A rod 78 is extended vertically upward from the float and is terminated above the cover plate of the pot. The position of the end of the rod indicates the height of electrolyte in the pot. If desired, the float may also be arranged to indicate the extent of rise of electrolyte during circuit interruption. For this purpose a clutch mechanism comprising one or more free balls 83 may be arranged to engage said rod 78 and hold the float from downward movement due to its weight, although permitting it to move upwardly without restriction.

The venting of the inner compartment 50 takes place about the stationary switch rod 68. At times electrolyte may be expelled from the compartment and may run over the surface of the insulating shield 66. Since the electrolyte is electrically conducting, it is desirable to make said shield larger in diameter than the diameter of the pot whereby to prevent flashover from the edge of the shield to the top of the pot. The diameter of the shield is also such that the drippings of electrolyte from the edge of the shield can not in themselves come so close to the pot as to establish a flashover path. The inner surface of the shield is adapted to be maintained dry at all times.

The circuit interrupting pots 30 and 32 and disconnecting pots 34 and 36 are carried by a movable switch member which includes the vertical switch rod 81. A pair of insulating bars 82 are secured transversely and on opposite sides of said rods and are adapted to support the aforementioned pots. Metal brackets 84 are disposed between said insulating bars 82 and are secured to the proximate ends thereof. One of said pots has a bracket 40 secured to it intermediate its ends, which bracket is secured to the end of one of said bars 82 by bolts 86 which pass directly through said bar and also through the adjacent bracket 84 thereby serving the dual purpose of mechanically supporting said pot and electrically connecting it with said bracket 84. The other pot 72 is similarly disposed on the remote end of the other insulating bar. The two pots are thereby disposed on opposite sides of the vertical rod 81 and provide a balanced structure. The disconnecting pots 34 and 36 are disposed in opposed relation with said pots 30 and 32 respectively and are secured to said bars 82 by bolts 88 which bolts also electrically connect said pots with the pots 30 and 32 through said interposed brackets 84.

The contact members in said pots may be all connected in series as illustrated in Fig. 7. The circuit may be established through the switch terminal 12 to the stationary contact rod, not shown, in the pot 36 by means of a conductor 90. The circuit is then through said pot 36 and through the brackets and bolts to the pot 32, thence through the contact members of said pot and through a conductor 92 to the stationary contact member, not shown, of the disconnecting pot 34. The circuit is thence through said pot and the brackets and bolts of the movable switch member to the pot 30. Connection is made between the stationary contact member of said pot through the conductor 94 to the other switch terminal 14.

The aforesaid pots may be enclosed in a cylindrical casing 96 which may be provided with a cylindrical insulating lining 98. The principal function of said casing is to enclose the live components of the interrupter and also to catch any electrolyte which may be expelled from the pots.

I claim:

1. A circuit interrupter including an electrolyte-containing receptacle having an electrically-conducting wall, a contact member carried by said receptacle beneath the electrolyte therein, a cooperating contact member loosely extended into said receptacle through the top thereof, an insulating bushing carried by said receptacle surrounding said cooperating contact member, said receptacle adapted to vent through said bushing and around said cooperating contact member, and means including a shield disposed above and extended laterally beyond said wall and carried by the top of said bushing to insulate the interrupter from a flash-over between said conducting wall and that portion of the last-named contact member which is without said receptacle.

2. A circuit interrupter including a liquid-containing receptacle, and an insulating bushing providing a vent passage having an outlet opening disposed above the top of the receptacle, separable contact members contained in said receptacle, and a shield disposed above said receptacle beneath the outlet opening and in position to divert away from said receptacle any liquid discharged from said openings.

3. A circuit interrupter including an electrolyte-containing receptacle having a conducting wall and a vertically disposed vent passage provided with an upwardly directed outlet opening disposed above the top of the receptacle, separable contact members normally immersed in the electrolyte, and a shield disposed above the top of said receptacle and beneath the outlet opening of said vent passage and in position to divert away from said receptacle any electrolyte which may escape from said outlet opening.

4. A circuit interrupter including an electrolyte-containing receptacle, an insulator extended through the top into the interior of said receptacle, and having a vent passage therethrough and having an opening at the top thereof, and a shield carried by said insulator above said receptacle below said vent opening and extended laterally beyond in all directions and spaced above the side wall of said receptacle.

5. A circuit interrupter including a movable fluid-containing receptacle having a contact member immersed in the fluid, an insulator carried by and extended through the top of said receptacle into the interior thereof and disposed above said contact member, a fixed contact rod extended loosely through said insulator into said receptacle, and a shield carried by said insulator below the top ther of and extended laterally above the top of said receptacle and outwardly in all directions beyond the sides thereof.

6. In a circuit interrupter, a fluid containing receptacle, an insulator comprising a cylindrical insulating unipart body extended into and spaced from the side walls of said receptacle and having a chamber in its lower end which is open at the bottom and is extended upwardly within said insulating body for a substantial distance, an axially-disposed passage of reduced cross-sectional dimensions arranged in communication with said chamber and extended upwardly from the top thereof to the upper end of said insulating body, a contact extended through said passage into said chamber, a cooperating contact member carried by said receptacle beneath and closely adjacent the open end of said chamber, a metal reinforcing shell disposed about said insulating body at said chamber and arranged in intimate contact with the side wall thereof, an outwardly-extended supporting flange carried by the insulating body intermediate its ends and above the top of said chamber, a receptacle-cover resting on said flange, and a petticoat carried by said body at the upper end thereof and above said flange and overlying the side walls of said receptacle, said receptacle adapted to vent through said insulating body and around the contact therein, and said petticoat constituting means to keep the vented electrolyte away from said receptacle.

7. A circuit interrupter including a fluid-containing receptacle having an open top, an insulator extended through the open top into the interior of said receptacle, said insulator having an outstanding flange secured to it which comprises the cover for the open top of said receptacle, and bolts passed through said flange into said receptacle and attached to the bottom thereof and located in said receptacle between the side wall thereof and said insulator.

8. In a circuit interrupter, the combination of an enclosing casing, stationary switch members carried by and extended therewithin, stationary contact members carried by and disposed within said casing, a movable switch member including a vertically movable switch rod, and a plurality of oil and electrolyte-containing receptacles carried by and disposed in alternate order symmetrically about said rod and having contact members disposed therewithin arranged to cooperate with said stationary contact members.

9. In a circuit interrupter, the combination of an enclosing casing, stationary switch members carried by and extended therewithin, stationary contact members carried by and disposed within said casing, a movable switch member disposed within said casing including a vertically movable switch rod, a pair of electrolyte-containing receptacles having cooperating movable contact members, which receptacles are carried by and disposed on opposite sides of and in the vertical plane of said rod, and a second pair of oil-containing receptacles having cooperating movable contact members, which receptacles are similarly carried by said rod equi-distant from said first receptacles, the movable contact members of said oil-containing receptacles having a lost motion connection with said movable switch member whereby to effect a time delayed movement thereof in a switch opening direction.

10. In a circuit interrupter, a movable switch member including a vertically movable switch rod, a pair of insulating bars connected to said rod on opposite sides thereof and extended in both directions therebeyond, conducting brackets disposed between the proximate ends of and rigidly connecting said bars, and contact-containing receptacles carried by said bars and having mechanical and electrical connection with said brackets.

In testimony whereof, I have signed my name to this specification.

DAVID C. GARROWAY.